Dec. 3, 1935.  H. M. BIEBEL  2,023,117
RANGE CONTROL SYSTEM
Filed March 30, 1934
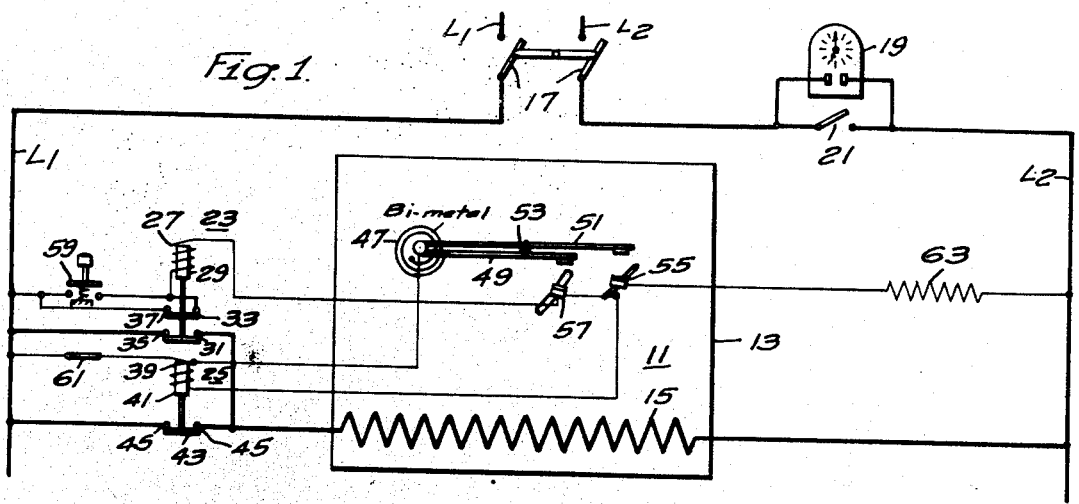
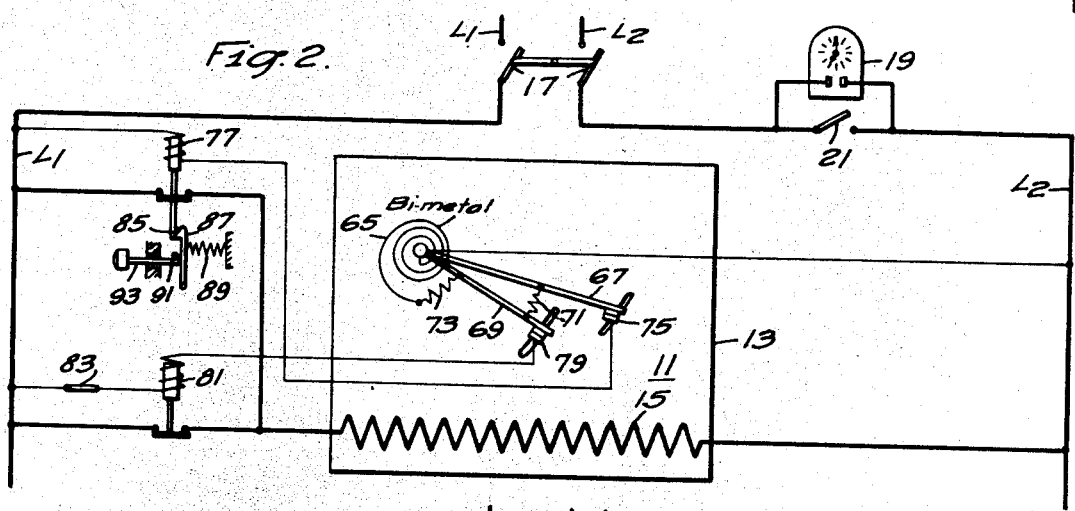
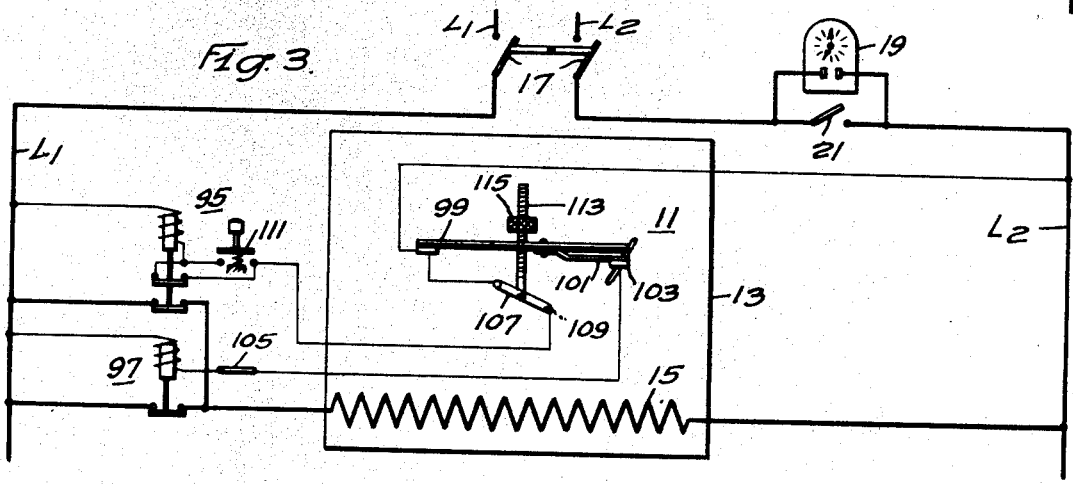
WITNESSES:
B. A. McCloskey.
Wm. C. Frome
INVENTOR
Herman M. Biebel.
BY W. R. Coley
ATTORNEY Patented Dec. 3, 1935

2,023,117

UNITED STATES PATENT OFFICE 2,023,117

RANGE CONTROL SYSTEM

Herman M. Biebel, Oakmont, Pa., assignor to Westinghouse Electric & Manufacturing Company, East Pittsburgh, Pa., a corporation of Pennsylvania Application March 30, 1934, Serial No. 718,276

11 Claims. (Cl. 219—20)

My invention relates to electric ranges and more particularly to temperature control systems for range ovens.

An object of my invention is to provide a relatively simple and inexpensive combination of elements for controlling the temperature in an oven chamber.

Another object is to provide a relatively simple thermo-electric system of temperature control for an oven chamber permitting of obtaining any one of a number of different temperature cycles in the chamber, at the will of an operator.

Other objects of my invention will either be specifically pointed out hereinafter or will be evident from the following description of the device or system embodying my invention and of its operation.

In practicing my invention, I provide a pair of contactors, one of these being a single-cycle contactor and the other being a plural-cycle contactor, a single thermal actuable element actuable by variations in chamber temperature and two resiliently-connected contact members moved by the thermal element. The respective contactors may be rendered effective or ineffective as desired.

In the accompanying single sheet of drawing:

Figure 1 is a schematic view of a combination of control elements embodying my invention;

Fig. 2 is a similar view of a modification embodying my invention; and,

Fig. 3 is a similar view of another combination of elements and system embodying my invention.

In the cooking of certain foods, particularly meat roasts, it is desirable that the exterior surface of the roast be seared at a relatively high temperature in order to cause the juices to remain within the roast itself during the remainder of the cooking operation, after which the cooking is effected at a substantially constant and relatively lower temperature. For illustrative purposes, the peak or searing temperature may be considered as on the order of 500° F., while the lower sustained or maintained temperature may be on the order of 300° F., although, in order to make the system of more general application in cooking, this temperature should be adjustable within relatively wide limits, and at least down to boiling or simmering temperature.

One of the time-temperature cycles which it is desired to obtain by the use of my system is, therefore, a momentary peak temperature on the order of 500° F. or over, and then a reduction to a lower maintained temperature on the order of 300° F. for a length of time sufficient to properly cook the meat to the desired degree.

In the ordinary manually controlled range or stove, the operator will provide by any suitable means, the initial high temperature required to sear the meat and will then arrange to subject the meat to the lower maintained temperature. This means an estimate on the part of the operator as to the length of time sufficient to properly sear the roast. However, the use of the system embodying my invention depending primarily upon the temperature in the oven chamber, does away with the need on the part of the operator for estimating or otherwise determining the length of time required for searing a piece of meat. It is obvious, of course, that a small roast, say on the order of three to five pounds, will be seared more quickly than a roast on the order of 15 lbs. or so.

Reference is here made to applicant's copending applications relating to similar subject-matter, Serial Nos. 718,272, 718,273, 718,274, 718,275 and 718,277 and to an application of F. S. Wheeler, Serial No. 718,278, all filed concurrently herewith.

Referring first to Fig. 1 of the drawing, I have there indicated an oven chamber 11 as enclosed by suitable walls 13 and an electric heating element 15 of such capacity that it can raise the temperature within the chamber 11 to the desired relatively high temperature within a reasonable time, irrespective of the quantity of food located in the oven chamber. Inasmuch as the details of construction of the oven walls and of the heating element constitute no part of my present invention, I have shown these schematically only.

The heating element 15 is to be energized from a suitable source of supply of electric energy indicated by supply circuit conductors $L_1$ and $L_2$, respectively, a main manually-operable switch 17, which may be of any suitable or desired type, such as a snap switch, being provided for actuation by an operator.

As it may, under certain circumstances, be desirable to provide time-controlled means for starting and stopping the energization of the heating element in a manner well known in the art, I may provide a clock 19 comprising circuit-controlling contacts therein, and in order to render the clock effective or ineffective, I may provide a manual switch 21 connected in parallel therewith.

Means for controlling the energization of the heating element 15 and, therefore, of the temperature in the oven chamber 11, includes a single-cycle contactor 23 and a plural-cycle contactor 25. The single cycle contactor 23 includes an actuating coil 27, an armature core 29 energized thereby, a main contact bridging member 31, an auxiliary contact bridging member 33, and fixed contact members 35 and 37 respectively adapted to engage with and be disengaged from the cooperating contact bridging members.

The plural-cycle contactor 25 includes an actuating coil 39, a movable core 41, a contact bridging member 43 and fixed contact members 45 cooperating with the contact bridging member.

Contacts 35 and the cooperating bridging member 31 are connected in series circuit relation with the heating element 15 one of the contact members 35 being connected to supply circuit conductor L1 while the other end of element 15 is connected to supply circuit conductor L2. One of the contacts 45 is also connected to conductor L1, the bridging member 43 and the other contact member being connected in series circuit with heating element 15, so that the two circuit controlling parts of the respective contactors are connected in parallel circuit with each other and in series circuit with the heating element 15 to severally or individually control the energization of the heating element.

I provide further a single thermally actuable element 47 shown in Fig. 1 of the drawing as being constituted by a bimetal spiral, one end of which is fixed and the other end of which is operatively connected to a first contact arm 49 pivotally mounted on a suitable pivot pin. I provide a second contact or contact arm 51 resiliently operatively connected to the first contact or contact arm by a spring 53. Upon expansion movement of the thermal member the first contact or contact arm is directly actuated while the second contact or contact arm is indirectly actuated, and it is obvious that if the second contact arm is stopped at any point in its pivotal movement, the first contact arm may still turn. I have not shown any specific details as to the construction and arrangement of the bimetal spiral and of the two contact arms as any suitable or desired construction effective for the intended purpose can be utilized, and I consider it necessary only to show and describe sufficient structure whereby to accomplish the desired purpose.

Means cooperating with the two movable contacts include a maintained-temperature stop-contact 55 which is also shown generally only, and is to be understood as being so designed, constructed and located as to be adjustable within the desired temperature limits, and a peak-temperature contact 57 which is to be understood as being also adjustable. Peak temperature contact 57 is electrically connected to one terminal of coil 27, the other terminal thereof being connected to a fixed contact of a normally open switch 59 which may be of the so-called "start push-button" type. The second contact bridging member 33 of contactor 23 is so connected in circuit with the manually actuable switch 59 and the coil 27 thereof as to provide a holding circuit for the coil, in a manner now well known in the art. Contact member 55 is connected in series circuit with coil 39 of contactor 25, the circuit of this coil including a manually actuable switch 61.

It will be noted that the thermally actuable plural arm switch of Fig. 1 of the drawing operates to deenergize the respective contactors by short-circuiting their actuating coils, and in order to reduce the current traversing the thermally actuable switch and its circuit I provide a single current limiting resistor 63 in a manner well known in the art.

Referring now to Fig. 2 of the drawing, I have there illustrated a modified form of control system embodying my invention as applied to an oven chamber 11 having a heating element 15 operatively associated therewith. I provide a thermally actuable element 65, here shown as a bimetal spiral and two contacts or contact arms 67 and 69, respectively, adapted to be actuated in a counter-clockwise direction by the thermal element upon a rising temperature and resiliently connected by a spring 71. To avoid undue stress of the bimetal spiral 65, the end thereof is connected through a spring 73 with arm or contact 69.

Arm 67 is adapted to normally engage an adjustably-mounted stop contact 75 which is connected in series circuit with the actuating coil of a contactor 77, it being noted that in this system the contactors are deenergized by opening the energizing circuit through the contactor coil. A second adjustably mounted contact 79 cooperates with arm 69 to control the circuit of a contactor 81 through the coil thereof, said circuit including also a manually actuable switch 83.

It will be noted that contactor 81 is a plural-cycle contactor and as it is desired that contactor 77 shall be a single-cycle contactor only, that is, that after having been moved to its open position, it will remain in that position until manually released by an operator, I provide a hook 85 operatively associated with the moving parts of contactor 77 and particularly secured to the bridging member thereof, which is adapted to be engaged and held by a latch 87 pivotally mounted and pressed by a spring 89 against the hook lug 85, its counterclockwise turning movement being limited by a stop pin 91. A manually adjustable push rod 93 is provided to effect release of the latch 87 from hook 85 when desired.

Referring now to Fig. 3 of the drawing, I have there illustrated a still further modification of a system embodying my invention as applied to an oven chamber 11 having a heating element 15 associated therewith. I provide, as before, two contactors, a single cycle contactor 95 and a plural cycle contactor 97, which severally control the energization of heating element 15 and are, therefore, connected in parallel particularly insofar as their circuit controlling elements are concerned.

Means for controlling the two contactors 95 and 97 include a thermally actuable element here shown as a bimetal strip 99 having its illustrated left-hand end thereof mounted on a suitable fixed base, the free end thereof having a suitable spring contact member 101 associated therewith which is adapted to engage with and be disengaged from an adjustably mounted contact 103. Contact member 103 is connected to one terminal of the actuating coil of contactor 97, a manually actuable switch 105 being also connected in this circuit, so that if switch 105 is closed and contact spring 101 is in engagement with contact 103, the actuating coil of contactor 97 is energized through a circuit shown as closed in the drawing. The contact member 103 may be called the maintained-temperature contact member.

A peak-temperature contact means is also provided and is actuable by the bimetal member 99, this means including a small switch arm 107, the illustrated left-hand end of which is pivotally mounted on a suitable support and initially engaging a contact member 109 which is connected through a normally open and manually closable switch 111 to the actuating coil of contactor 95. A rod 113 extends through an opening in bimetal strip 99, and has its lower end pivotally connected to switch arm 107 and has its upper end externally screw-threaded to receive a knurled nut 115 thereon. The nut 115 can be adjusted axially of the rod 113 to thereby also vary the chamber temperature at which the bimetal bar moving in a counter-clockwise direction with increasing chamber temperature will actuate the same to open or disengage arm 107 from contact 109.

As shown in Fig. 3 of the drawing, the single cycle contactor 95 is provided with a holding circuit in cooperation with manually actuable switch 111, in a manner well known in the art, and it is thought unnecessary to further apply reference numerals to the respective details and parts of the system.

The manually actuable switches 59 of Fig. 1 and 111 of Fig. 3 with the holding circuits of which they form a part, and the latch 87 of Fig. 2 form means for preventing reclosing of the corresponding contactors by the operation of the thermally actuable switches controlling them after having been caused thereby to move into the open position.

Referring now to Fig. 1 of the drawing, let it be assumed that an operator desires to cook a piece of meat by subjecting it first to a gradually increasing temperature until a predetermined peak temperature is reached, and to thereafter subject it to a sustained or maintained lower temperature. Let it be assumed that switch 17 has been closed and that it is not desired to use the time clock so that switch 21 is also closed. Switch 61 is moved to its closed position and switch 59 is also momentarily closed, whereby the various parts of the system will be in the position shown in Fig. 1 of the drawing, it being assumed that the oven chamber temperature is substantially that of the room. The movement of the bimetal element 47 will be such as to turn the contacts or contact arms 49 and 51 in a clockwise direction upon increase of temperature. It will further be evident that since both contactors 23 and 25 have been properly energized, the control of heating element 15 is effected by the two contactors in parallel circuit relation with each other.

After a certain length of time, depending upon the various constants of the system, the temperature in oven chamber 11 will reach a predetermined lower temperature substantially that of the maintained temperature at which time arm 51 will engage stop contact 55, whereby coil 39 of contactor 25 is short-circuited and the contactor is, therefore, deenergized. This results in the disengagement of bridging member 43 from its cooperating contacts, but since contactor 23 is still energized, current will still traverse heating element 15 and will continue to traverse it until, with further increase in the chamber temperature, contact arm 49 is moved into engagement with stop contact 51. The result of this engagement is that contactor 23 is deenergized by reason of the short circuit of its coil 27. The heating element 15 is, therefore, deenergized and the temperature in chamber 11 will therefore gradually decrease.

Even though at a certain temperature slightly below the peak or maximum temperature, contact arm 49 is disengaged from contact 51, no change in position of contactor 23 can occur because of the opening of the holding circuit thereof. The temperature in the chamber will, therefore, continue to decrease until at a certain lower temperature (which may be assumed for illustrative purposes to be 300° F.), arm 51 is disengaged from contact 55, whereupon coil 39 is re-energized, the contactor, therefore, closing its circuit to re-energize heating element 15. This results in again increasing the temperature in the oven chamber and at a certain slightly higher temperature, arm 51 is again caused to engage with contact 55, deenergizing the contactor coil and the circuit controlled by contactor 25. This intermittent sequential energization and deenergization of the contactor 25 and, therefore, of heating element 15 will maintain a substantially constant average temperature in the cooking chamber and will continue as long as the main circuit is energized, which time may be terminated either by the clock or by the operator opening main switch 17.

It will be noted that I have provided a yielding connection between arms 49 and 51 so that even though arm 51 engages stop contact 55, arm 49 may still be moved in a clockwise movement until it engages its cooperating contact member 57 in the manner set forth.

If it should be desired to obtain a peak temperature cycle only, this can be done by the operator opening switch 61 to thereby render ineffective contactor 25. Upon energizing the circuit, as was hereinbefore stated, by the momentary closure of switch 59, the operation will be substantially the same as was hereinbefore set forth for the first part of the temperature cycle except that as the contactor 25 has been rendered ineffective, it will remain in its open position. When arm 49 engages contact 57 the contactor 23 is deenergized and opens the circuit through heating element 15. The temperature in the chamber 11 will, therefore, gradually decrease and any further cooking of the food in the oven chamber will be effected by stored heat only.

If it is desired to operate with a maintained temperature cycle only this can be done by the operator closing switch 61 but not actuating switch 59 momentarily. The control of the heating element 15 is now effected by contactor 25 alone in the manner already set forth hereinbefore, and a substantially constant average maintained temperature will be provided in the oven chamber for as long a time as may be desired by the operator.

Referring now to Fig. 2 of the drawing this modified form of system operates in substantially the same manner as was hereinbefore set forth for the system shown in Fig. 1 of the drawing. If, upon closing main switch 17 and by-pass switch 21, the operator closes switch 83 and pushes on push rod 93 to release the movable parts of contactor 77, a combination peak and maintained temperature cycle will be obtained. If the operator does not push on push rod 93 to release hook 85, a maintained temperature cycle only will be obtained. If the operator does not close switch 83 but does actuate push rod 93 to release hook 85 a peak temperature cycle only will be obtained.

Referring to Fig. 3 of the drawing, bimetal bar 99 turns in a counter-clockwise direction upon increase of temperature in oven chamber 11, and if switches 17 and 21 are closed, as well as switch 105, and switch 111 momentarily only, a peak and then a maintained temperature cycle will be obtained. Upon the temperature in the chamber 11 reaching a certain value, the spring contact 101 will be disengaged from contact 103, thereby deenergizing the coil of contactor 97. However, energization of the heating element continues by reason of the closed position of contactor 95. At a certain higher temperature nut 115 is engaged by the bimetal bar 99 to move switch bar 107 to open position, thereby deenergizing contactor 95. By reason of the holding circuit provided for contactor 95 it will remain in its open position even after the temperature in chamber 11 has been reduced to a value where switch arm 107 is again in engagement with contact 109. It is only when spring arm 101 reengages contact 103 to thereby reenergize contactor 97 that heating element 15 is again energized and the same intermittent sequential energization and deenergization of contactor 97 and, therefore, of heating element 15, is effected as has already been described.

If it is desired to obtain a peak temperature cycle only, switch 105 is moved to its open position by the operator, and switch 111 is closed momentarily and if a maintained temperature cycle only is desired, switch 105 is closed and switch 111 is not actuated momentarily to its closed position. The operation of the various parts of the system is the same as was hereinbefore set forth for the other figures of the drawing.

The device and system embodying my invention thus provides relatively simple, easily manufactured, inexpensive and readily installed means for obtaining any one of a number of different time-temperature cycles on the part of an operator in an electrically heated oven by purely thermo-electric means.

Various further modifications may be made in the device and system embodying my invention without departing from the spirit and scope thereof, and I desire, therefore, that only such limitations shall be placed thereon as are imposed by the prior art or are set forth in the appended claims.

I claim as my invention:

1. In an electric cooking appliance including a cooking chamber and a heating element therefor, means for obtaining a peak temperature and then a maintained lower temperature cycle in the cooking chamber, said means including a single-cycle contactor controlling the energization of the heating element, a plural-cycle contactor controlling the energization of the heating element, conductors connecting said contactors in parallel with each other, a pair of spaced contact terminals individually connected in circuit with the respective contactor coils and thermally-actuable plural contact means responsive to chamber temperature cooperating with the pair of spaced contact terminals to control the contactors, the first of the plural contact means initially cooperating with the contact terminal in the circuit of the plural-cycle contactor coil to effect opening of the plural cycle contactor, the second of the plural contact means then cooperating with the contact terminal in the circuit of the single-cycle contactor to effect deenergization of the heating element at the desired peak temperature, the first contact means thereafter cooperating with the plural-cycle contactor to intermittently sequentially energize and deenergize the heating element.

2. In an electric cooking appliance including a cooking chamber and a heating element therefor, a first contactor for controlling the energization of the heating element, means operatively associated with the first contactor to cause it to remain in open position after it has been moved to that position, a second contactor for controlling the energization of the heating element, electric conductors connecting the contactors in parallel with each other, a single thermal element actuable in response to variations in chamber temperature, a first contact arm directly actuated by the thermal element, a peak temperature contact adapted to be engaged by the first contact arm at a certain high temperature and electrically connected to the coil of said first contactor, a second contact arm resiliently connected to said first contact arm, a maintained-temperature contact adapted to be engaged by the second contact arm at a certain lower chamber temperature and electrically connected to the coil of the second contactor, engagement of the second contact arm with the maintained temperature contact causing opening of the second contactor, the first contactor continuing energization of the heating element until the first contact arm engages the peak temperature contact, after which the second contactor intermittently sequentially energizes and deenergizes the heating element by reason of the cooperation of the second contact arm and the maintained temperature contact.

3. In an electric cooking appliance including a cooking chamber and a heating element therefor, a pair of parallel connected contactors for controlling the energization of the heating element, a pair of spring-connected contact arms actuated by a single thermal element in accordance with variations in the chamber temperature, a high-temperature contact and a lower maintained-temperature contact adapted to be operatively engaged by the respective contact arms in predetermined sequence, conductors connecting the respective contacts to the contactor coils and means operatively associated with that contactor having the high-temperature contact connected thereto to cause it to remain in open position after it has been moved into such position.

4. In an electric cooking appliance including a cooking chamber and a heating element therefor, means for controlling the energization of the heating element to obtain a peak temperature and then a maintained lower temperature cycle in the cooking chamber, said means including a single-cycle contactor and a plural-cycle contactor electrically connected in parallel with each other for controlling the circuit of the heating element, a single thermal element subjected to the chamber temperature, a pair of spring-connected contact members actuated by the thermal element and contacts individually engageable by the respective contact members and electrically connected to the respective contactor coils, whereby the single-cycle contactor initially controls the energization of the heating element to obtain a peak temperature and the plural-cycle contactor thereafter controls the energization of the heating element to obtain a maintained lower temperature in the cooking chamber.

5. A device as set forth in claim 4 which includes means for rendering the two contactors individually effective and ineffective at the will of an operator.

6. A device as set forth in claim 4 in which the circuit of each contactor coil includes a manually actuable switch for rendering the two contactors individually effective and ineffective at the will of an operator.

7. A device as set forth in claim 4 in which the engagement of the contact arms and the contacts short circuits the cooperating contactor coils.

8. In an electric cooking appliance including a cooking chamber and a heating element therefor, means for obtaining a peak temperature and then a lower maintained temperature in the cooking chamber, said means including a first and a second contactor electrically connected in parallel and controlling the energization of the heating element, means operatively associated with said second contactor to cause the contactor to remain in open position after having been moved into such position, a circuit for each of the contactor coils including a contact terminal, a thermally-actuable plural-contact means responsive to chamber temperature adapted to co-operate with the contact terminals to control the contactors, engagement of the first of said thermally actuable contacts with the contact terminal of the circuit of the first contactor coil effecting opening of the first contactor and engagement of the second contact with the contact terminal in the circuit of the second contactor coil causing deenergization of the heating element, the first thermally-actuable contact thereafter cooperating with the contact terminal in the circuit of the first contactor coil to intermittently sequentially energize and deenergize the heating element.

9. A device as set forth in claim 4 in which the means for rendering ineffective the single cycle contactor is a manually releasable mechanical latch for the contactor.

10. A device as set forth in claim 4 in which the means for rendering ineffective the single cycle contactor includes a holding circuit for the contactor and a manually actuable switch.

11. In an electric cooking appliance including a cooking chamber and a heating element therefor, a pair of parallel connected contactors for controlling the energization of the heating element, a pair of spring-connected contact arms actuated by a single thermal element in accordance with variations in the chamber temperature, a high temperature contact and a lower maintained-temperature contact adapted to be operatively engaged by the respective contact arms in predetermined sequence, conductors connecting the respective contacts to the contactor coils and means operatively associated with that contactor having the high-temperature contact connected thereto to prevent reclosing thereof by the action of the thermal element and the cooperating contact and contact arm after having been caused to move into open position thereby.

HERMAN M. BIEBEL.